G. T. WHITTEN.
BEEHIVE.
APPLICATION FILED JULY 19, 1913.

1,085,775.

Patented Feb. 3, 1914.

2 SHEETS—SHEET 1.

Witnesses:
Josephine M. Strempfer
Rebecca Itzkovitch

Inventor:
George T. Whitten
by Harry R. Williams att.

COLUMBIA PLANOGRAPH CO., WASHINGTON, D. C.

G. T. WHITTEN.
BEEHIVE.
APPLICATION FILED JULY 19, 1913.
1,085,775.
Patented Feb. 3, 1914.
2 SHEETS—SHEET 2.
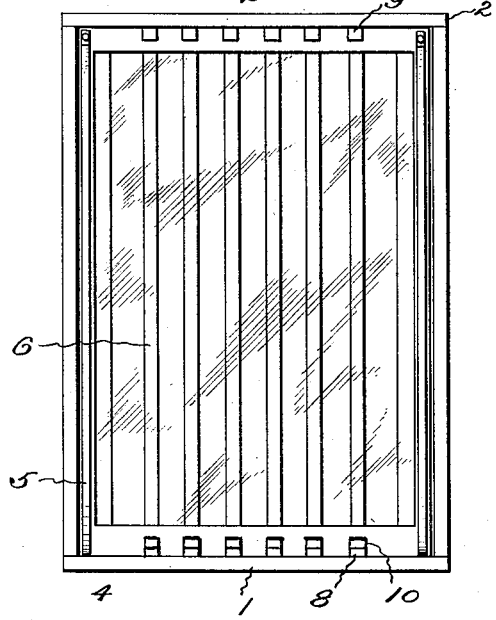
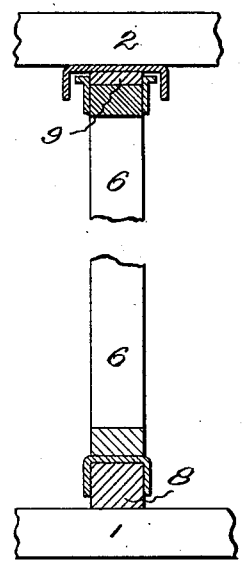
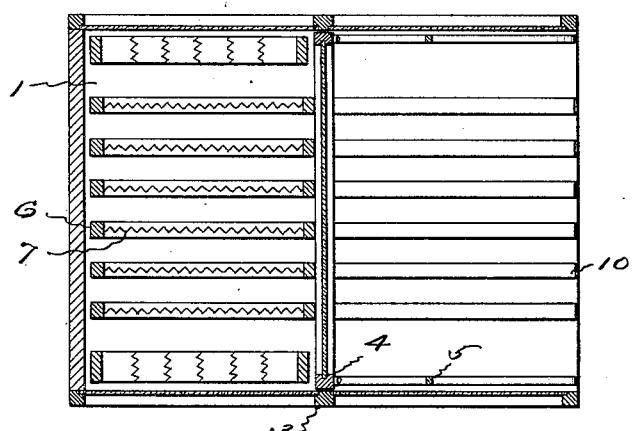
Witnesses:
Josephine M. Strempfer
Rebecca Itzkovitch
Inventor:
George T. Whitten
by Harry R. Williams
atty.
COLUMBIA PLANOGRAPH CO., WASHINGTON, D. C.

UNITED STATES PATENT OFFICE.

GEORGE T. WHITTEN, OF HARTFORD, CONNECTICUT.

BEEHIVE.

1,085,775.  Specification of Letters Patent.  Patented Feb. 3, 1914.

Application filed July 19, 1913. Serial No. 780,059.

*To all whom it may concern:*

Be it known that I, GEORGE T. WHITTEN, a citizen of the United States, residing at Hartford, in the county of Hartford and State of Connecticut, have invented a new and useful Improvement in Beehives, of which the following is a specification.

This invention relates to a bee-hive which is constructed in such manner that the brood-comb frames may be withdrawn from the rear at any time for the purpose of observing their state and the condition of the bees.

The object of the invention is to provide a very simple and cheap hive of this character which may be used for commercial purposes, but which is particularly adapted for bee breeding and scientific observation of the work of the bees. In attaining this end the back of the hive is made removable and the comb frames are arranged in such manner that any one may be drawn to the rear, when the back is drawn out, and after examination returned to its normal place without disturbing the bees and without necessitating the removal of the upper frames which are ordinarily placed on the top of the hive for collecting the edible honey, thereby enabling a large number of hives to be examined in a much shorter time with less labor than at present.

Figure 1:
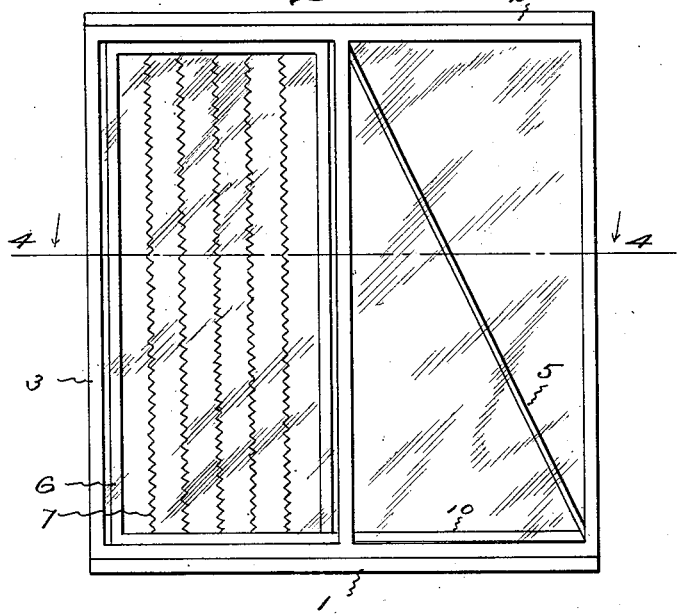
Figure 2:
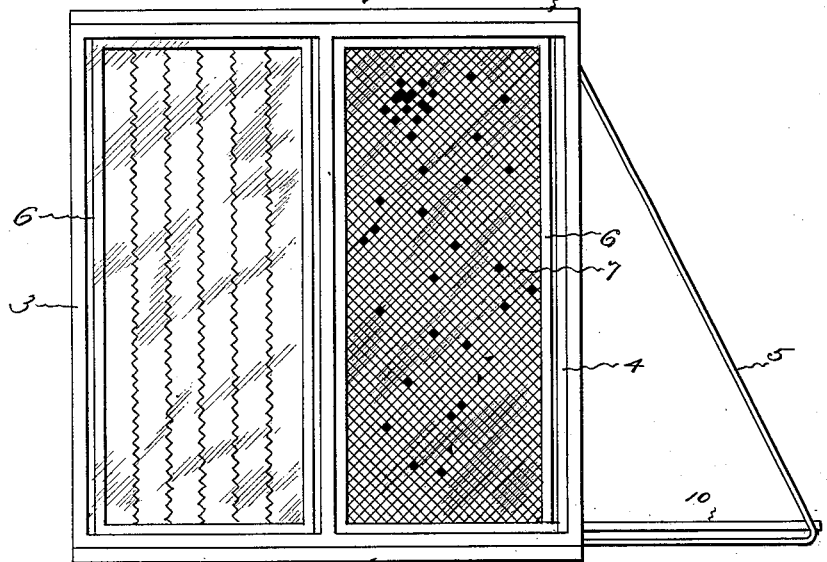

Figure 1 of the accompanying drawings shows a side elevation, with the back closed and the brood-comb frames in normal position, of an observation bee-hive which embodies this invention. Fig. 2 is a similar view with the back withdrawn and one of the brood comb frames pulled to the rear so that it may be observed. Fig. 3 is an elevation looking at the back. Fig. 4 is a horizontal section on the plane indicated by the dotted line 4—4 on Fig. 1. Fig. 5 is a sectional view on larger scale of one of the top guide runs for a comb frame. Fig. 6 is a similar view of one of the bottom track runs for a comb frame.

The hive illustrated has a bottom 1 and a top 2 fastened to the side frames 3. The side frames of the hive shown are filled with window glass, but of course they may be filled with wood or other material. The rear of the hive shown is closed by a back frame 4 that is glazed and is movable at will toward the front and the rear of the hive. The back fits the top, bottom and sides closely and is provided with straps or handles 5 by means of which it may be moved in or out. The brood comb frames 6 are arranged vertically in the front part of the hive, those in the interior preferably having the comb foundations 7 extending from front to back and those on the outsides preferably having the comb foundations extending crosswise of the hive. Extending from front to back on the bottom are tracks 8 upon which the comb frames will slide, and extending from front to back on the under side of the top are guide runs 9. These guide runs and tracks may be made of wood or metal in such form that the bees will not be able to fasten the frames to them. At the bottom each one of the interior comb frames may be provided with a handle bar 10 that will extend through the back toward the rear, so the comb frames may be pushed in or out without completely opening the rear of the hive.

In the particular hive shown the top, bottom and sides extend considerably farther back than the rear edge of the comb frames. This enables the back to be drawn rearward without opening the hive and then any one of the brood-comb frames may be pulled back from its position so that the condition of the bees and the state of the comb can be readily observed without disturbing the bees or permitting them to escape. After observation the comb is pushed back to place and the back moved up to its normal position. This particular form of hive is especially serviceable for the purposes of study and scientific observation of bees.

For commercial purposes it is unnecessary to have the top, bottom and sides extend rearward beyond the back. In this case the back is removed and the desired comb slid out from position on the run-way and after being examined in the open is slid back into place and the back put in place and fastened. A hive constructed in this manner can be quickly examined for discovering the condition of the comb, the working of the bees, and such other conditions, as the overcrowding of the hive so that swarming may be guarded against, may be observed, enabling the keeper to obtain the best results from his bees. With a hive constructed in this way it is unnecessary to take off the super-hives for the purpose of ascertaining the conditions, and this besides saving labor, economizes time to such an extent that a large number of hives can be quickly examined without disturbing the bees.

The invention claimed is:

1. A bee-hive having top, bottom, front and sides, said sides being glazed, a back movable toward the front and the rear in the hive, and vertically arranged comb frames movable in the hive toward the rear when the back is withdrawn whereby any frame can be examined without opening the hive.

2. A bee-hive consisting of a top, bottom, front and sides, said sides being glazed, a glazed back movable toward the front and the rear in the hive, and vertically arranged comb frames movable toward the rear when the back is withdrawn whereby any frame can be examined without opening the hive.

3. A bee-hive having a front, top, bottom, and glazed sides that extend rearward beyond the comb chamber, a glazed back movable toward and from the rear of the comb chamber, comb frames arranged vertically in the comb chamber, and means for drawing the comb frames individually toward the rear when the back is withdrawn whereby any frame can be examined without opening the hive.

4. A bee-hive having glazed side walls that extend rearward beyond the comb chamber, a back fitting the walls of the hive and movable toward the front and rear, runs on the top and bottom of the hive that extend front and back, comb frames slidably mounted on said runs, and means for drawing the comb frames to the rear when the back is withdrawn whereby any frame can be examined without opening the hive.

GEORGE T. WHITTEN.

Witnesses:
HARRY R. WILLIAMS,
JOSEPHINE M. STREMPFER.

Copies of this patent may be obtained for five cents each, by addressing the "Commissioner of Patents, Washington, D. C."